US008017696B2

(12) United States Patent  
Lin et al.

(10) Patent No.: US 8,017,696 B2
(45) Date of Patent: Sep. 13, 2011

(54) TIRE COMPOSITIONS AND VULCANIZATES THEREOF HAVING IMPROVED SILICA REINFORCEMENT

(75) Inventors: Chenchy Jeffrey Lin, Hudson, OH (US); Christine Rademacher, Akron, OH (US); Shunji Araki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 879 days.

(21) Appl. No.: 11/331,517

(22) Filed: Jan. 13, 2006

(65) Prior Publication Data

US 2006/0169391 A1    Aug. 3, 2006

Related U.S. Application Data

(60) Provisional application No. 60/644,162, filed on Jan. 14, 2005.

(51) Int. Cl.
  B29C 35/02 (2006.01)
  B60C 1/00 (2006.01)
  C08C 19/25 (2006.01)
  C08F 291/02 (2006.01)
  C08F 253/00 (2006.01)
  C08K 3/04 (2006.01)
  C08K 3/10 (2006.01)
  C08K 3/36 (2006.01)
  C08L 51/04 (2006.01)

(52) U.S. Cl. ............... 525/370; 156/110.1; 524/492; 524/495; 524/543; 525/330.9; 525/331.9; 525/332.5; 525/332.6; 525/360; 528/17; 528/18; 528/30; 528/33; 528/34

(58) Field of Classification Search ............ 152/564; 156/110.1; 523/351; 524/86, 102, 109, 110, 524/111, 205, 236, 262, 267, 289, 366, 376, 524/378, 392, 500, 418, 431, 456, 487, 492, 524/493, 495, 588, 791, 947, 594, 543; 525/330.9, 525/331.8, 331.9, 332.6, 342, 398, 477, 360, 525/370, 332.5, 791, 947; 528/17, 18, 30, 528/33, 34
See application file for complete search history.

(56) References Cited

U.S. PATENT DOCUMENTS

| 5,508,333 | A | 4/1996 | Shimizu | 524/414 |
|---|---|---|---|---|
| 5,811,479 | A | 9/1998 | Labauze | 524/188 |
| 6,008,295 | A | 12/1999 | Takeichi et al. | 525/105 |
| 6,048,943 | A | 4/2000 | Blok et al. | 525/311.8 |
| 6,372,855 | B1 | 4/2002 | Chino et al. | |
| 6,620,871 | B2 * | 9/2003 | Wilson, III | 524/398 |
| 6,699,935 | B2 | 3/2004 | Akema et al. | |
| 6,713,541 | B1 | 3/2004 | Hergenrother et al. | 524/76 |
| 6,727,307 | B2 | 4/2004 | Kondo et al. | |
| 6,809,135 | B2 | 10/2004 | Bowen, III et al. | 524/178 |
| 2001/0051681 | A1 | 12/2001 | Visel et al. | |
| 2002/0010258 | A1 | 1/2002 | Bowen, III et al. | 524/572 |
| 2002/0055568 | A1 | 5/2002 | Cruse et al. | 524/262 |
| 2002/0099118 | A1 | 7/2002 | Cruse et al. | 524/262 |
| 2004/0152811 | A1 | 8/2004 | Lin et al. | 524/261 |
| 2004/0225038 | A1 * | 11/2004 | Lin et al. | 524/109 |
| 2005/0020757 | A1 | 1/2005 | Ozawa et al. | 524/492 |
| 2005/0070672 | A1 | 3/2005 | Ozawa et al. | 525/331.9 |
| 2005/0085582 | A1 | 4/2005 | Galimberti et al. | 524/492 |
| 2005/0159554 | A1 | 7/2005 | Endou et al. | 525/242 |
| 2005/0239946 | A1 | 10/2005 | Lin et al. | 524/492 |
| 2006/0089446 | A1 | 4/2006 | Lin et al. | 524/492 |

FOREIGN PATENT DOCUMENTS

WO 02/38663 5/2002
WO WO 2004072135 A1 * 8/2004

OTHER PUBLICATIONS

Liu, Ju Zheng and Richard D. Ernst. Bis (2,4-dimethylpentadienyl) titanium: an open titanocene. (1982) Journal of the American Chemical Society, 104 (13), p. 3737-3739. (Available online at:http://pubs.acs.org/doi/pdf/10.1021/ja00377a040).*
Lin et al., Rubber Chem. Tech., vol. 75, p. 215 (2002).
Lin et al., Rubber Chem. Tech., vol. 75 p. 865 (2002).
Edwards and Sato, Paper No. 7, presented at meeting of Rubber Division, American Chemical Society, Cleveland, Ohio, Oct. 23-26, 1979.
Tan et al., Rubber Chemistry and Technology, vol. 66, p. 594 (1993).
Nakamura and Takagishi, Paper No. 30, presented at meeting of The Rubber Division, American Chemical Society, Dallas, Texas, Apr. 4-6, 2000.
Lin et al., Paper No. 58, 163$^{rd}$ ACS Rubber Division Meeting, San Francisco, CA, Apr. 28-30, 2003.

* cited by examiner

*Primary Examiner* — Milton I Cano
*Assistant Examiner* — Darcy D LaClair
(74) *Attorney, Agent, or Firm* — Meredith E. Hooker; Arthur M. Reginelli

(57) ABSTRACT

Vulcanizable elastomeric compositions and vulcanizates are prepared by employing a titanium compound. The titanium compound is believed to enhance the reaction between a silica particle and a silica-reactive compound.

8 Claims, No Drawings

TIRE COMPOSITIONS AND VULCANIZATES THEREOF HAVING IMPROVED SILICA REINFORCEMENT

This application gains benefit from U.S. Provisional Application No. 60/644,162, filed Jan. 14, 2005.

FIELD OF THE INVENTION

One or more embodiments of the present invention relates to tire compositions and vulcanizates thereof, as well as methods for making the same, having improved silica reinforcement deriving, at least in part, from the presence of titanium compounds during the mixing of silica and silica reactive compounds.

BACKGROUND OF THE INVENTION

Inorganic fillers, such as silica, are believed to impart improved wet traction, rolling resistance, tear strength, snow traction and other performance parameters when used as filler within tire treads. Mixing silica into a tire stock, however, can be difficult because silica particles agglomerate extensively and therefore are not easily dispersed. In addition, silica particles are less compatible than carbon black with rubber molecules. In response, processing and dispersing aids and coupling agents are often used during compounding.

In the art of making tires, it is desirable to employ rubber vulcanizates that demonstrate improved rolling resistance, wet skid resistance, and reduced hysteresis loss at certain temperatures. Factors believed to affect these properties include the degree of filler networking (particle agglomeration), the degree of polymer-filler interaction, the cross-link density of the rubber, and polymer free ends within the cross-linked rubber network.

Because precipitated silica has been increasingly used as reinforcing particulate filler in tires, there is a need to overcome the processing problems associated with silica fillers. Additionally, there is a need to increase polymer-filler interaction in silica-filled tires, thereby improving rolling resistance, wear resistance, and wet skid resistance.

SUMMARY OF THE INVENTION

In general the present invention provides a method for preparing a tire, the method comprising the steps of mixing ingredients including silica and at least one elastomer to form a first mixture, where the elastomer optionally includes silica-reactive functionalized elastomer, cooling the first mixture, further mixing the first mixture, optionally with additional ingredients including a silica coupling agent and a silica reactive dispersing agent, to form an intermediate mixture, with the proviso that at least one of the ingredients mixed to form the first mixture or the additional ingredients added to form the intermediate composition includes a silica-reactive compound, adding ingredients including a curative to the intermediate mixture to form a vulcanizable mixture, mixing the vulcanizable mixture, forming the vulcanizable mixture into a tire component, building a tire by including the tire component, curing the tire; where a titanium compound is added to at least one of said step of mixing ingredients to form a first mixture or said step of further mixing to form an intermediate mixture.

The present invention also provides a method for preparing a tire, the method comprising the steps of mixing ingredients including silica-reactive functionalized elastomer, silica, titanium compound and optionally additional rubbery polymer to form an initial composition, cooling the initial composition, further mixing the initial composition, optionally with additional ingredients including a silica coupling agent and a silica reactive dispersing agent, to form an intermediate composition, adding ingredients including a curative to the intermediate composition to form a vulcanizable mixture, mixing the vulcanizable mixture, forming the vulcanizable mixture into a tire component, building a tire by including the tire component, curing the tire.

The present invention further provides a method for preparing a tire, the method comprising the steps of mixing ingredients including silica and at least one elastomer to form an initial composition, where the elastomer optionally includes silica-reactive functionalized elastomer, cooling the initial composition, further mixing the initial composition with additional ingredients including at least one of a silica coupling agent and a silica reactive dispersing agent to form an intermediate composition, adding ingredients including a curative to the intermediate composition to form a vulcanizable mixture, mixing the vulcanizable mixture, forming the vulcanizable mixture into a tire component, building a tire by including the tire component, curing the tire; where said method includes the step of adding a titanium compound, and where said titanium compound is added prior to or during said step of further mixing.

The present invention also provides a method for forming a mixture, the method comprising mixing a silica particle, a silica-interactive compound, and a titanium compound.

DETAILED DESCRIPTION OF ILLUSTRATIVE EMBODIMENTS

Vulcanizable compositions are prepared by mixing silica, a silica-reactive compound, and a titanium compound. The titanium compound is believed to enhance the reaction between the silica and the silica-reactive compound.

In one or more embodiments, the silica-reactive compound includes a silica-reactive functional group, i.e. a group or moiety that will react with silica to form an ionic or covalent bond. Useful functional groups that react with silica typically are electron donors or are capable of reacting with a proton. Exemplary groups include alkoxysilyl, hydroxyl, polyalkylene glycol, silyl halide, anhydride, organic acid, and epoxy groups. Useful silica-reactive compounds containing one or more of these functional groups include functionalized elastomers, silica coupling agents, and silica-reactive dispersing aids.

In one embodiment, alkoxysilyl functional groups can be represented by the formula

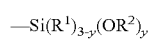

where each $R^1$ is independently a halogen or a monovalent organic group, each $R^2$ is independently a monovalent organic group, and y is an integer from 1 to 3. The halogen is preferably chlorine, bromine, iodine, or fluorine, more preferably chlorine. The monovalent organic groups include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. Preferably, $R^2$ has from 1 to about 4 carbon atoms.

In one embodiment, the silica-reactive compound is a functionalized elastomer that contains a silica-reactive functional group. These polymers can be represented by the formula

where ∼∼∼ is an elastomeric polymer and A is a silica-reactive functional group. These groups may include one or more silica-reactive functionalities or moieties. Also, the polymers may include more than one silica-reactive group.

The polymer having a silica-reactive functional group attached thereto may include any elastomer conventionally employed in vulcanizable elastomeric compositions including natural and synthetic elastomers. In one embodiment, the synthetic elastomers derive from the polymerization of conjugated diene monomers, which may be copolymerized with other monomers such as vinyl aromatic monomers. In other embodiments, the rubbery elastomers may derive from the polymerization of ethylene together with one or more α-olefins and optionally one or more diene monomers.

Useful elastomeric polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), and mixtures thereof. These elastomers can have a myriad of macromolecular structures including linear, branched and star shaped. In one embodiment, the elastomers include homopolymers or copolymers of conjugated $C_4$-$C_{12}$ dienes, $C_8$-$C_{18}$ monovinyl aromatic monomers, and optionally $C_6$-$C_{20}$ trienes. In one embodiment, the elastomer includes a random copolymer of styrene and butadiene.

Where the functional group A is an alkoxysilyl functional group, the functionalized elastomer can be represented by the formula

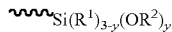

where ∼∼∼ is an elastomeric polymer, and each $R^1$ and $R^2$ and y are as described above.

The alkoxysilyl-functionalized elastomer may be prepared by initiating polymerization with an alkoxysilyl-containing initiator. In a preferred embodiment, the alkoxysilyl-functionalized elastomer is prepared by reacting a living polymer chain with a siloxane terminating agent. Preparation of living polymers is well-known. Anionically polymerized diene polymers and copolymers containing functional groups derived from alkoxysilyl terminating agents are further described in U.S. Pat. Nos. 6,008,295 and 6,228,908, and U.S. Provisional Application No. 60/565,723, which are incorporated herein by reference. Preferred alkoxysilyl terminating agents include tetraethyl orthosilicate. Preferred alkoxysilyl-functionalized elastomer includes copolymers of styrene and butadiene that are terminated with tetraethyl orthosilicate.

Elastomers having a silica-reactive epoxy group may include epoxidized rubber. Epoxidized rubber is a modified rubber where some of the rubber's unsaturation is replaced by epoxide groups. Epoxidized rubber is further described in co-pending U.S. application Ser. No. 10/269,445, which is incorporated herein by reference.

In one embodiment, the silica-reactive compound is a silica coupling agent. In general, silica coupling agents include a silica-reactive functional group; and a moiety (e.g., a mercapto, vinyl, or sulfur group) that will react or interact with the elastomer.

Silica coupling agents are further described in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 and 5,696,197, 6,608,145, and 6,667,362, which are incorporated herein by reference. Suitable silica coupling agents include an alkoxysilyl or silyl halide functional group. Examples of silica coupling agents include bis(trialkoxysilylorgano)polysulfides, mercaptosilanes, and blocked mercaptosilanes.

Bis(trialkoxysilylorgano)polysulfides include bis(trialkoxysilylorgano)disulfides and bis(trialkoxysilylorgano)tetrasulfides. Examples of bis(trialkoxysilylorgano)disulfides include 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 3,3'-bis(triisopropoxysilylpropyl)disulfide, 3,3'-bis(dimethoxyphenylsilyl-2-methylpropyl)disulfide, and mixtures thereof.

Examples of bis(trialkoxysilylorgano)tetrasulfide silica coupling agents include bis(3-triethoxysilylpropyl)tetrasulfide, bis(2-triethoxysilylethyl)tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69 by Degussa.

Suitable mercaptosilanes include compounds represented by the formula

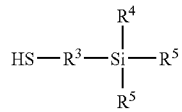

where $R^3$ is a divalent organic group or a bond, $R^4$ is a halogen atom or an alkoxy group, and each $R^5$ is independently a halogen, an alkoxy group, or a monovalent organic group. Preferably, at least one of $R^4$ and $R^5$ is an alkoxy group, and more preferably $R^4$ and each $R^5$ is an alkoxy group. The alkoxy group preferably has from 1 to 4 carbon atoms. The divalent organic group is preferably an alkylene group containing from 1 to about 4 carbon atoms. The halogen is preferably chlorine, bromine, iodine, or fluorine, more preferably chlorine.

The monovalent organic groups are preferably hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 30 carbon atoms. These hydrocarbyl groups may contain heteroatoms such as, but not limited to, nitrogen, oxygen, silicon, sulfur, and phosphorus atoms.

Examples of mercaptosilanes include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproproxysilane, 18-mercaptooctadecyldiethoxychlorosilane, 1-mercaptomethyltrimethoxysilane, 2-mercaptoethyltrimethoxysilane, 3-mercaptopropyltrimethoxysilane, 3-mercaptopropylmethyldiethoxysilane, 18-mercaptooctadecyldiethoxychlorosilane, and mixtures thereof.

Suitable mercaptosilanes also include blocked mercaptosilane compounds when used in conjunction with a deblocking agent. Blocked mercaptosilanes include sulfur-containing silanes where a sulfur atom is bonded to a silyl group, optionally through a linking moiety, and the sulfur atom is also bonded to a blocking group. During processing, the blocking group is removed to form a mercaptosilane that is capable of acting as a coupling agent. An example of a simple blocked mercaptosilane can be represented by the formula

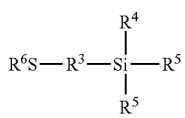

where $R^3$, and $R^5$ are as described above, and $R^6$ is a blocking group that will come off during processing leaving the S free to react with the polymer. Preferably, $R^6$ contains an unsaturated heteroatom or carbon chemically bound directly to S via a single bond, and is optionally substituted with one or more carboxylate ester or carboxylic acid functional groups. More preferably, $R^6$ is a carboxy group having from 1 to about 18 carbon atoms. Blocked mercaptosilanes are further described in U.S. Pat. Nos. 6,579,949 and 6,683,135, which are incorporated herein by reference.

Examples of blocked mercaptosilanes include 2-triethoxysilyl-1-ethyl thioacetate, 2-trimethoxysilyl-1-ethyl thioacetate, 2-(methyldimethoxysilyl)-1-ethyl thioacetate, 3-trimethoxysilyl-1-propyl thioacetate, triethoxysilylmethyl thioacetate, trimethoxysilylmethyl thioacetate, triisopropoxysilylmethyl thioacetate, methyldiethoxysilylmethyl thioacetate, methyldimethoxysilylmethyl thioacetate, methyldiisopropoxysilylmethyl thioacetate, dimethylethoxysilylmethyl thioacetate, dimethylmethoxysilylmethyl thioacetate, dimethylisopropoxysilylmethyl thioacetate, 2-triisopropoxysilyl-1-ethyl thioacetate, 2-(methyldiethoxysilyl)-1-ethyl thioacetate, 2-(methyldiisopropoxysilyl)-1-ethyl thioacetate, 2-(dimethylethoxysilyl)-1-ethyl thioacetate, 2-(dimethylmethoxysilyl)-1-ethyl thioacetate, 2-(dimethylisopropoxysilyl)-1-ethyl thioacetate, 3-triethoxysilyl-1-propyl thioacetate, 3-triisopropoxysilyl-1-propyl thioacetate, 3-methyldiethoxysilyl-1-propyl thioacetate, 3-methyldimethoxysilyl-1-propyl thioacetate, 3-methyldiisopropoxysilyl-1-propyl thioacetate, 1-(2-triethoxysilyl-1-ethyl)-4-thioacetylcyclohexane, 1-(2-triethoxysilyl-1-ethyl)-3-thioacetylcyclohexane, 2-triethoxysilyl-5-thioacetylnorbornene, 2-triethoxysilyl-4-thioacetylnorbornene, 2-(2-triethoxysilyl-1-ethyl)-5-thioacetylnorbornene, 2-(2-triethoxysilyl-1-ethyl)-4-thioacetylnorbornene, 1-(1-oxo-2-thia-5-triethoxysilylpenyl)benzoic acid, 6-triethoxysilyl-1-hexyl thioacetate, 1-triethoxysilyl-5-hexyl thioacetate, 8-triethoxysilyl-1-octyl thioacetate, 1-triethoxysilyl-7-octyl thioacetate, 6-triethoxysilyl-1-hexyl thioacetate, 1-triethoxysilyl-5-octyl thioacetate, 8-trimethoxysilyl-1-octyl thioacetate, 1-trimethoxysilyl-7-octyl thioacetate, 10-triethoxysilyl-1-decyl thioacetate, 1-triethoxysilyl-9-decyl thioacetate, 1-triethoxysilyl-2-butyl thioacetate, 1-triethoxysilyl-3-butyl thioacetate, 1-triethoxysilyl-3-methyl-2-butyl thioacetate, 1-triethoxysilyl-3-methyl-3-butyl thioacetate, 3-trimethoxysilyl-1-propyl thiooctanoate, 3-triethoxysilyl-1-propyl thiopalmitate, 3-triethoxysilyl-1-propyl thiooctanoate, 3-triethoxysilyl-1-propyl thiobenzoate, 3-triethoxysilyl-1-propyl thio-2-ethylhexanoate, 3-methyldiacetoxysilyl-1-propyl thioacetate, 3-triacetoxysilyl-1-propyl thioacetate, 2-methyldiacetoxysilyl-1-ethyl thioacetate, 2-triacetoxysilyl-1-ethyl thioacetate, 1-methyldiacetoxysilyl-1-ethyl thioacetate, 1-triacetoxysilyl-1-ethyl thioacetate. Blocked mercaptosilanes are commercially available from GE Silicones-OSi Specialties as NXT® silanes.

Blocked mercaptosilanes are preferably used in conjunction with a deblocking agent. Preferred deblocking agents can function as a proton source and a blocking group acceptor. When reaction of the mixture to couple the filler to the polymer is desired, a deblocking agent is added to the mixture to deblock the blocked mercaptosilane. Suitable deblocking agents include ethylene glycol, polyethylene glycols, propylene glycol, polypropylene glycols, mixed ethylene-propylene glycols, alkyl-terminated glycols, glycerol, trimethylol alkanes, pentaerythritol, phenol, catechol, and mixtures thereof. Preferred deblocking agents include glycerol, trimethylol propane, and ethylene glycol. The deblocking agent may be added at quantities ranging from about 0.1 to about 5 parts per hundred rubber (phr), more preferably in the range of from about 0.5 to about 3 phr. Deblocking is further described in U.S. Pat. Nos. 6,579,949 and 6,683,135, which are incorporated herein by reference.

If desired, the silica coupling agent may be added in an amount of from about 0.01 to about 25 parts by weight per hundred parts by weight silica, preferably from about 0.5 to about 15 parts by weight per hundred parts by weight silica, and more preferably from about 1 to about 10 parts by weight per hundred parts by weight silica. In one embodiment, where silica-reactive functionalized elastomer is employed, the amount of silica coupling agent may be reduced, when compared to conventional methods.

In one embodiment, the silica-reactive compound is a silica reactive dispersing agent. Silica reactive dispersing agents include a silica-reactive functional group, but differ from silica coupling agents in that silica reactive dispersing agents generally are not reactive with the elastomer. In one or more embodiments, these dispersing agents improve the processability of silica-filled rubber compounds by reducing the compound viscosity, increasing the scorch time, and reducing silica reagglomeration.

Examples of suitable silica reactive dispersing agents include glycols, fatty acids, fatty acid esters, and alkyl alkoxysilanes. These silica reactive dispersing agents can be used to replace all or part of the silica coupling agents.

Alkyl alkoxysilanes suitable for use as silica reactive dispersing agents include an alkoxysilyl functional group and can be described by the formula

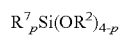

where each $R^2$ is independently as described above, each $R^7$ is independently a monovalent organic group, and p is an integer from 1 to 3, with the proviso that at least one $R^7$ is an alkyl group. Preferably, p is 1.

Examples of alkyl alkoxysilanes include octyl triethoxysilane, octyl trimethoxysilane, cyclohexyl triethoxysilane, isobutyl triethoxysilane, cyclohexyl tributoxysilane, dimethyl diethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane.

Specific examples of glycols include diethylene glycol or polyethylene glycol.

Useful amide compounds include those described in U.S. Pat. No. 6,590,017, which is incorporated herein by reference. Examples of these compounds include erucamide, octadecanamide, ε-caprolactam, N,N-diethyldodecanamide, and N,N-diethyl-m-toluamide.

Useful fatty acid esters include those described in U.S. Pat. Nos. 6,590,017, 6,525,118, and 6,342,552, which are incorporated herein by reference. Examples include fatty acid esters of hydrogenated and non-hydrogenated $C_5$ and $C_6$ sugars such as sorbitan monooleate, dioleate, trioleate, and sesquioleate, as well as sorbitan esters of laurate, palmitate and stearate fatty acids. Also included are polyoxyethylene derivatives of fatty acid esters of hydrogenated and non-hydrogenated $C_5$ and $C_6$ sugars such as polysorbates and polyoxyethylene sorbitan esters, which are analogous to the fatty acid esters of hydrogenated and non-hydrogenated sugars noted above except that ethylene oxide groups are placed on each of the hydroxyl groups.

Generally, a useful amount of these optional silica reactive dispersing aids is from about 0.1 to about 25 parts by weight per hundred parts by weight silica, preferably from about 0.5 to about 20 parts by weight per hundred parts by weight silica, more preferably from about 1 to about 15 parts by weight per hundred parts by weight silica.

Various titanium compounds or mixtures thereof can be employed in the practice of this invention. The titanium atom or atoms within these compounds can be in various oxidation states. In one or more embodiments, the titanium atom can be in the +2, +3, or +4 oxidation state. Types of titanium compounds include titanium oxides, titanium alkoxides, titanium aryloxides, titanium enolates, and organotitanium compounds. In one or more embodiments, the titanium compounds employed exclude or are devoid of sulfur-containing titanium compounds including those described in U.S. Pat. No. 6,048,943, which is incorporated herein by reference.

Useful titanium oxides include titanium dioxide, titanium (II) oxide, titanium(III) oxide, titanium(IV) oxide (i.e., titanium dioxide), and mixtures thereof.

Useful titanium alkoxides include titanium methoxide, titanium ethoxide, titanium isopropoxide, titanium 2-ethylhexoxide, titanium pentoxide, titanium(IV)butoxide, titanium(IV)tert-butoxide, titanium(IV) 2-ethylhexoxide, titanium(IV)isopropoxide, titanium(IV)methoxide, titanium(IV)propoxide, titanium(IV)(triethanolaminato) isopropoxide, titanium(IV)bis(ethyl acetoacetato) diisopropoxide, titanium(IV)nitrate, titanium(IV) tetrahydrofurfuryloxide, titanium(IV)stearyl oxide, and mixtures thereof.

Useful titanium aryloxides include titanium phenoxide, titanium nonylphenoxide, titanium naphthoxide, and mixtures thereof.

Useful titanium enolates include titanium diisopropoxide bis(acetylacetonate), titanium(IV)diisopropoxide bis(2,2,6,6-tetramethyl-3,5-heptanedionate), titanium(IV) 2-ethyl-1,3-hexanediolate, titanium(IV)oxide acetylacetonate, and mixtures thereof.

Useful organotitanium compounds include tris(allyl)titanium, tris(methallyl)titanium, tris(crotyl)titanium, bis(cyclopentadienyl)titanium, bis(pentamethylcyclopentadienyl)titanium, bis(ethylbenzene)titanium, bis(mesitylene)titanium, bis(pentadienyl)titanium, bis(2,4-dimethylpentadienyl)titanium, bis(allyl)tricarbonyl titanium, (cyclopentadienyl)(pentadienyl)titanium, tetra(1-norbornyl)titanium(trimethylenemethane)titanium, bis(butadiene)dicarbonyl titanium, (butadiene)tetracarbonyl titanium, bis(cyclooctatetraene)titanium, and mixtures thereof.

Other useful titanium compounds include titanium(IV)bis (ammonium lactato)dihydroxide, titanium nitride, titanium (IV)oxysulfate, titanium)IV)phthalocyanine dichloride, and mixtures thereof.

The amount of titanium compound is not particularly limited, but is preferably from about 0.001 to about 20 parts by weight per hundred parts silica, more preferably from about 0.005 to about 10 parts by weight parts by weight per hundred parts silica, even more preferably from about 0.05 to about 8 and still more preferably from about 0.1 to about 6 parts by weight per hundred parts silica.

Useful silica (silicon dioxide) includes wet-process, hydrated silica produced by a chemical reaction in water, and precipitated as ultra-fine spherical particles. Useful silicas preferably have a surface area, as measured by the BET method, of about 32 to about 400 $m^2/g$, preferably about 100 to about 250 $m^2/g$, and more preferably about 150 to about 220 $m^2/g$. The pH of the silica filler is generally about 5.5 to about 7 and preferably about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ S/kg (Bary AG), Ultrasil™ VN2, VN3 (Degussa), and HuberSil™ 8745 (Huber).

Silica may be used in an amount from about 5 to about 100 parts by weight phr, preferably from about 10 to about 90 parts by weight phr, more preferably from about 15 to about 85 parts by weight phr, and still more preferably from about 25 to about 75 parts by weight phr.

Other ingredients that may be employed in the vulcanizable elastomeric compositions and vulcanizates include additional filler, processing aids, additional rubbery polymers, cure agents and accelerators.

Other fillers that may be used include carbon black, alumina, aluminum hydroxide, magnesium hydroxide, clays (hydrated aluminum silicates), and starch. The total amount of filler employed is typically from about 1 to about 100 phr, and preferably from about 20 to about 90 parts by weight phr, and more preferably from about 40 to about 80 parts by weight phr.

Useful carbon black includes any commonly available carbon black, but those having a surface area (EMSA) of at least 20 $m^2/g$, and more preferably at least 35 $m^2/g$ up to 200 $m^2/g$ or higher, are preferred. Surface area values used in this application are those determined by ASTM test D-1765 by using the cetyltrimethyl-ammonium bromide (CTAB) technique.

Carbon black can also be used to support any of the silica reactive dispersing aids, acids, and silica coupling agents described above. If desired, carbon black may be used in an amount from about 0.5 to about 70 parts by weight phr, preferably from about 1 to about 50 parts by weight phr, and more preferably from about 2 to about 40 parts by weight phr.

The term processing aids commonly includes a broad category of substances that improve various aspects of the process of forming vulcanizable compositions and vulcanizates. For example, processing aids may prevent filler agglomeration and reduce viscosity. Silica processing aids may operate via physically coating the silica particle, or may interact with the silica particle via through-space interaction (e.g. hydrogen bonding, van der Waals interaction, etc.). The silica processing aids shield the silanol groups on the surface of the silica particles, to prevent reagglomeration or flocculation of the silica particles. Examples of processing aids include fatty acid esters of hydrogenated and non-hydrogenated $C_5$ and $C_6$ sugars, polyoxyethylene derivatives of fatty acid esters, amines, oils, mineral fillers, and non-mineral fillers.

Examples of fatty acid esters of hydrogenated and non-hydrogenated $C_5$ and $C_6$ sugars (e.g., sorbose, mannose, and arabinose) that are useful as silica processing aids include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan include the sorbitan monooleates known as Alkamul® SMO, Capmul® O, Glycomul® O, Arlacel® 80, Emsorb® 2500, and S-Maz® 80. When used with bis(trialkoxysilylorgano)polysulfide silica coupling agents, these fatty acid esters are preferably present in an amount of from about 0.1% to about 25% by weight based on the weight of the silica, more preferably from about 0.5% to about 20% by weight of silica, even more preferably from about 1% to about 15% by weight based on the weight of silica.

Examples of polyoxyethylene derivatives of fatty acid esters of hydrogenated and non-hydrogenated $C_5$ and $C_6$ sugars include polysorbates and polyoxyethylene sorbitan esters, which are analogous to the fatty acid esters of hydrogenated and non-hydrogenated sugars noted above except that ethylene oxide groups are placed on each of the hydroxyl groups. Commercially available polyoxyethylene derivatives of sorbitan include POE® (20) sorbitan monooleate, Polysorbate® 80, Tween® 80, Emsorb® 6900, Liposorb® O-20, and T-Maz® 80. The Tween® products are commercially available from ICI Specialty Chemicals. Generally, a useful amount of these optional silica shielding aids is from about 0.1% to about 25% by weight based on the weight of the silica, preferably from about 0.5% to about 20% by weight, more preferably from about 1% to about 15% by weight based on the weight of the silica.

Certain additional fillers can be utilized as processing aids, including clay (hydrated aluminum silicate), talc (hydrated magnesium silicate), aluminum hydrate [$Al(OH)_3$], mica, and sodium sulfate. Preferred micas principally contain alumina and silica. When used, these fillers can be present in the amount of from about 0.5 to about 40 phr, preferably in an amount of about 1 to about 20 phr, more preferably in an amount of about 1 to about 10 phr. These additional fillers can also be used as carriers to support any of the silica reactive dispersing aids, acids, and silica coupling agents described above.

To the extent that these processing aids contain a hydroxy group that is reactive toward the silica particles, the titanium compound may act to enhance this reaction.

One or more additional elastomers, sometimes called rubbery elastomers or rubbery polymers, may be employed. Rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Preferred elastomers include homopolymers or copolymers of conjugated $C_4$-$C_{12}$ dienes, $C_8$-$C_{18}$ monovinyl aromatic monomers, and $C_6$-$C_{20}$ trienes.

Preferably, from about 5 to about 100 percent of the total elastomer molecules are functionalized with the silica-reactive functional group. More preferably, from about 10 to about 90 percent and even more preferably from about 20 to about 80 percent of the total elastomer molecules are functionalized with the silica-reactive functional group.

A multitude of rubber curing agents may be employed, including sulfur or peroxide-based curing systems. Curing agents are described in *Kirk-Othmer, Encyclopedia of Chemical Technology*, Vol. 20, pp. 365-468, ($3^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference. Vulcanizing agents may be used alone or in combination.

The vulcanization accelerators are not particularly limited. Examples include thiazoles, dithiocarbamates, dithiophosphates, guanidines, sulfenamides, sulfenimides, and thiurams. Specific examples include 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine. If used, the amount of accelerator is preferably from about 0.1 to about 5 phr, more preferably from about 0.2 to about 3 phr.

Oils, waxes, scorch inhibiting agents, tackifying resins, reinforcing resins, fatty acids, peptizers, and zinc oxide may also be employed.

The present invention provides a method for forming a mixture of ingredients including silica filler, a silica-reactive compound, and a titanium compound. The order in which the silica filler, silica-reactive compound and titanium compound are added can vary within the scope of the invention, however increased interaction between the silica particle and silica-reactive compound is believed to occur when the silica filler and the silica-reactive compound are combined in the presence of the titanium compound.

In one embodiment, the mixture is a vulcanizable rubber composition, such as a tire formulation. It is believed that within tire formulations, hydrogen or hydrolytic bonding can occur between silica particles causing filler agglomeration. Through-space interaction between the functional groups of functionalized elastomers is also believed to occur. It is believed that the titanium compound aids in breaking these through-space interactions, which increases interaction between the particle and the elastomer. When the titanium compound is mixed with just the functionalized elastomer however, it is believed that the through-space interactions (e.g., van der Walls or hydrogen bonding) of the functionalized elastomer break, but then may re-form if there is no silica particle to interact with. Likewise, when the titanium compound is mixed with just the silica particles, it is believed that the hydrolytic bonds of the silica filler break, but then may re-form if there is no silica reactive compound to interact with. In one embodiment, therefore, the titanium compound is added to a mixture containing silica filler and silica-reactive compound.

Generally, tire formulations are prepared by a multi-step process. For example, multiple mixing steps are typically employed when preparing silica-filled rubber compositions as described in U.S. Pat. Nos. 5,227,425, 5,719,207, 5,717, 022, as well as European Pat. No. 890,606, all of which are incorporated herein by reference.

The vulcanizable rubber composition may be prepared by forming an initial masterbatch composition that includes elastomer, silica, and optionally other ingredients. To prevent premature vulcanization, this initial composition generally excludes any vulcanizing agents. One or more of the ingredients may be added in increments.

Once the initial masterbatch composition is processed, the vulcanizing agents may be introduced and blended into the initial masterbatch to form a final mix. Additional ingredients, such as accelerators, may be added to the final mix during this stage. The final mix is preferably prepared at, low temperatures that do not initiate the vulcanization process.

Optionally, additional mixing stages can be employed between the initial mix stage and the final mix stage. Additional mixing stages where no additional ingredients are added can be referred to as remill stages, while mixing stages where ingredients are added are called masterbatch stages, and can be further denoted by ordinal designations, such as second masterbatch and so on.

One or more ingredients of the tire formulation may be premixed with a carrier. Suitable carriers include any material that is not deleterious to the mixture (i.e., tire formulation). Examples include stearic acid, mineral oil, plastics, wax and organic solvents. In one embodiment, the titanium compound is combined with a carrier to form a premix. Preferably, the premix contains from about 1 part by weight heterocycle per 3 parts by weight carrier to about 1 part by weight titanium compound per 1 part by weight carrier.

In one embodiment, the initial masterbatch composition includes a silica-reactive functionalized elastomer, silica, a titanium compound, and optionally other ingredients including additional elastomer and carbon black.

Silica coupling agents and silica reactive dispersing agents are optional ingredients, and may be added as part of the initial composition, or may be added to the initial composition during an additional masterbatch step. In one embodiment, the titanium compound is preferably added prior to or at the same time as the silica coupling agent or silica reactive dispersing agent.

Two types of temperatures will be referred to herein. One type, the mixer temperature, refers to the stabilized temperature of the mixing equipment prior to addition of the ingredients. The second type refers to the surface temperature of the composition. Unless specifically referred to as the mixer temperature, any reference to temperature in this specification should be understood to mean the surface temperature of the composition.

For the initial masterbatch mixing step, and any subsequent masterbatch mixing steps, the initial mixer temperature is preferably from about 25° C. to about 158° C., and more preferably from about 70 to about 155° C. The mixing conditions are preferably controlled to maintain the surface temperature of the composition within the range of about 25° C. to about 195° C., more preferably about 100° C. to about 185° C., and even more preferably about 135° C. to about 165° C. during mixing. These mixing conditions are maintained for the amount of time necessary to achieve good dispersion of the filler within the rubber. One of ordinary skill in the art will appreciate that the necessary amount of time will vary depending upon such factors as mixer size, sheer, temperature, and the like.

In between each mixing stage, the mixed composition may be cooled to a surface temperature below the intended temperature for the next mixing step. This may be accomplished by discharging the mixed composition, cooling, and re-charging the same mixer apparatus or transferring the composition to another mixer. Alternatively, the mixed composition may be cooled within the mixer.

During the optional remill mixing steps, the mixing conditions are preferably controlled to achieve a surface temperature of the composition within the range of about 70° C. to about 175° C., more preferably about 135° C. to about 165° C., and even more preferably about 140° C. to about 160° C. These mixing conditions are maintained for the amount of time necessary to reduce the viscosity and improve the dispersion of the filler within the rubber. One of ordinary skill in the art will appreciate that the necessary amount of time will vary depending upon such factors as mixer size, sheer, temperature, and the like. A remill step may be performed in the same mixer used for the masterbatches, or the mixture may be transferred to another mixer.

The final mixing stage, during which the cure agents and accelerators are added, is performed at a temperature below the vulcanization temperature. More specifically, the mixing conditions are preferably controlled to achieve a surface temperature of the composition within the range of about 40° C. to about 120° C., more preferably about 60° C. to about 110° C., and even more preferably about 75° C. to about 100. These conditions are maintained for the amount of time necessary to achieve good mixing.

The method of this invention is particularly useful in preparing tire components such as treads, subtreads, black sidewalls, body ply skins, bead filler, and the like. The construction and curing of the tire is not affected by the practice of this invention. Rubber compounding techniques and the additives employed therein are further described in Stephens, *The Compounding and Vulcanization of Rubber*, in *Rubber Technology* ($2^{nd}$ Ed. 1973).

Where the vulcanizable rubber compositions are employed in the manufacture of tires, these compositions can be processed into tire components according to ordinary tire manufacturing techniques including standard rubber shaping, molding and curing techniques. Pneumatic tires can be made as discussed in U.S. Pat. Nos. 5,866,171, 5,876,527, 5,931,211, and 5,971,046, which are incorporated herein by reference.

In certain embodiments, the tire compositions of this invention advantageously have improved rubber compound reinforcement, which is believed to be caused by increased polymer-filler interaction, which results in improved rolling resistance, reduced wear, and improved wet traction. Excellent polymer processability is maintained. These tire compositions can be readily prepared by the subject method.

In order to demonstrate the practice of the present invention, the following examples have been prepared and tested. The examples should not, however, be viewed as limiting the scope of the invention. The claims will serve to define the invention.

EXAMPLES

Synthesis of Trialkoxysilyl-Functionalized SBR Polymer

Trialkoxysilyl-functionalized SBR polymer was prepared by conventional anionic semi-batch polymerization using n-butyllithium as an initiator and tetraethyl orthosilicate as a terminator. Sorbitan trioleate and 2-ethylhexanoic acid were added, and the polymer was stabilized with 2,6-di-t-butyl-p-cresol. The polymer was coagulated and drum dried. NMR analysis of this base polymer indicated a styrene content of about 34 percent and approximately 17 percent of the butadiene in the 1,2-configuration. DSC indicated that the polymer had a glass transition temperature of about −45° C., and GPC using polystyrene standards, indicated a weight average molecular weight of about 295 kg/mol with a polydispersity of about 1.51.

Examples 1-2

Preparation of Vulcanizable Elastomeric Composition

The trialkoxysilyl-functionalized SBR polymer was employed in carbon black/silica tire formulations. The formulations are presented in Table I.

TABLE I

|  | Example No. | | |
| --- | --- | --- | --- |
|  | 1 | 2 | 3 |
| Initial (parts by weight) | | | |
| Trialkoxysilyl-functionalized SBR | 100 | 100 | 100 |
| Titanium (IV) 2-ethyl-1,3-hexanediolate | 0 | 1.2 | 0 |
| Titanium (IV) stearyloxide | 0 | 0 | 2.4 |
| Carbon Black (SAF) | 40 | 40 | 40 |
| Silica | 35 | 35 | 35 |
| Wax | 1.5 | 1.5 | 1.5 |
| Antioxidant | 0.95 | 0.95 | 0.95 |
| Process Oil | 29.16 | 29.16 | 29.16 |
| Other Mineral Filler | 10 | 10 | 10 |
| Second (parts by weight) | | | |
| Disulfane | 3.15 | 3.15 | 3.15 |
| Final (parts by weight) | | | |
| Sulfur | 2.3 | 2.3 | 2.3 |
| Zinc Oxide | 1.7 | 1.7 | 1.7 |
| Stearic Acid | 0.5 | 0.5 | 0.5 |
| Accelerator 1 | 1.6 | 1.6 | 1.6 |
| Accelerator 2 | 0.6 | 0.6 | 0.6 |
| Accelerator 3 | 1.6 | 1.6 | 1.6 |
| Accelerator 4 | 1.7 | 1.7 | 1.7 |

Each carbon black/silica rubber compound was prepared in three stages named Initial Masterbatch, Second Masterbatch, and Final. In the initial masterbatch stage, the alkoxysilyl-functionalized SBR was mixed with silica, carbon black, titanium compound and other ingredients in a 1,300 g Banbury mixer operating at 60 RPM at an initial mixer temperature of about 99° C. The initial composition was mixed for 3 minutes. At the end of the mixing, the target surface temperature of the material was approximately 155° C. The samples were cooled to less than about 80° C. and transferred to a second mixer.

In the second masterbatch stage, the initial composition was mixed with disulfane at about 60 RPM. The starting temperature of the mixer was about 80° C. The second masterbatch material was removed from the mixer after about 2 minutes, when the targeted surface temperature of the material was between 135 and 150° C.

The final composition was mixed by adding the second masterbatch composition, curative materials, and other ingredients as listed in Table II to the mixer simultaneously. The starting mixer temperature was 62° C. and it was operating at 60 RPM. The final composition was removed from the mixer after 1 minute, when the targeted surface temperature of the material was about 104° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Tensile mechanical properties were measured using ASTM-D 412 at 25° C. Tensile tests were performed on ring-shaped and dumbbell-shaped samples. The ring samples were about 1.3 mm in width and 1.9 mm in thickness, and the gauge length was 25.4 mm.

The green stock Mooney viscosity measurements were taken at 130° C. The sample was preheated for 1 minute, a large rotor was started, and the torque was measured after 4 minutes of rotation. Mooney scorch measurements, specifically the time required for an increase of 5 Mooney units (T5) can indicate how fast the compound viscosity will increase during extrusion processes. Curing characteristics were measured using a Monsanto Rheometer MD2000, at a frequency of 1.67 Hz, 160° C., and a strain of 7%. MH and ML are the measured maximum and minimum torques, respectively. TS2 is the time required for the torque to reach 2% of the total torque increase during the curing process. T90 is the time required for the torque to reach 90% of the total torque increase during the curing process.

The Lambourn test was used to evaluate the wear resistance of the samples. Specifically, samples shaped like donuts with an inside diameter of about 28.6 mm, an outer diameter of about 4.83 cm, and a thickness of about 4.95 nm were placed on an axle and run at a slip ratio of 65% against a driven abrasive surface.

The Zwick rebound resilience tester measures Rebound Resilience as a very basic dynamic-test. The test piece is subjected to one half-cycle of deformation. Sample geometry is round with a dimension of 1.50" in diameter and 0.075" in thickness. The specimen is strained by impacting the test piece with an indentor which is free to rebound after the impact. Rebound resilience is defined as the ratio of mechanical energies before and after impact. Samples were preheated at a temperature interested for 30 minutes before testing.

Dynamic properties were determined by using a Rheometrics Dynamic Analyzer (RDA). The tan δ was obtained from temperature sweep experiments conducted with a frequency of 31.4 rad/sec using 0.5% strain for temperatures ranging from −100° C. to −10° C., and with 2% strain for temperatures ranging from −10° C. to 100° C.

TABLE II

|  | 1 | 2 | 3 |
| --- | --- | --- | --- |
| Green Stock Mooney & Curing Characteristics | | | |
| Mooney @ 130° C. | 69.33 | 73.19 | 71.63 |
| T5 scorch @ 130° C. (sec) | 761 | 860 | 780 |
| TS2 @ 160° C. (min) | 2.52 | 2.8 | 2.74 |
| T90 @ 160° C. (min) | 2.38 | 2.66 | 2.53 |
| MH-ML | 5.37 | 5.4 | 5.63 |
| Dynamic Viscoelastic Properties | | | |
| Temperature Sweep (MPa) | | | |
| G' @ −20° C. | 31.28 | 27.71 | 28.98 |
| tan δ @ 0° C. | 0.3674 | 0.3729 | 0.3733 |
| tan δ @ 50° C. | 0.2427 | 0.2187 | 0.2174 |
| Dynamic Compression | | | |
| tan δ @ 0° C. | 0.2749 | 0.3102 | 0.3121 |
| tan δ @ 50° C. | 0.2155 | 0.2086 | 0.2098 |
| 50° C. Rebound | 49.60 | 50.20 | 50.40 |

Various modifications and alterations that do not depart from the scope and spirit of this invention will become apparent to those skilled in the art. This invention is not to be duly limited to the illustrative embodiments set forth herein.

What is claimed is:

1. A method for preparing a tire, the method comprising the steps of:
mixing ingredients including from about 25 to about 75 parts by weight phr silica, from about 0.1 to about 6 parts by weight of titanium (IV) 2-ethyl-1,3-hexanediolate, per hundred parts by weight silica, and at least one elastomer to form a first mixture, where the elastomer is a homopolymer or copolymer of conjugated $C_4$-$C_{12}$ dienes, $C_8$-$C_{18}$ monovinyl aromatic monomers, and $C_6$-$C_{20}$ trienes, and where from about 5 to about 100% of the elastomer is functionalized with a silica-reactive functional group;
cooling the first mixture;
further mixing the first mixture with additional ingredients including from about 0.01 to about 25 parts by weight silica coupling agent per hundred parts by weight silica and optionally, a silica reactive dispersing agent, to form an intermediate mixture;
adding ingredients including a curative to the intermediate mixture to form a vulcanizable mixture;
mixing the vulcanizable mixture;
forming the vulcanizable mixture into a tire component;
building a tire by including the tire component; and curing the tire.

2. The method of claim 1, where the silica-reactive functional group includes an alkoxysilyl, hydroxyl, polyalkylene glycol, silyl halide, or epoxy functional group.

3. The method of claim 2, where the silica-reactive functional group includes an alkoxysilyl substituent defined by the formula

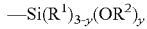

where each $R^1$ is independently a halogen atom or a monovalent organic group, each $R^2$ is independently a monovalent organic group, and y is an integer from 1 to 3.

4. The method of claim 1, where the vulcanizable mixture comprises from about 0.1 to about 25 parts by weight silica reactive dispersing agent per hundred parts by weight silica.

5. A method for preparing a tire, the method comprising the steps of:
mixing ingredients including silica and at least one elastomer to form an initial composition, where the elastomer is a homopolymer or copolymer of conjugated $C_4$-$C_{12}$ dienes, $C_8$-$C_{18}$ monovinyl aromatic monomers, and $C_6$-$C_{20}$ trienes, where the elastomer optionally includes silica-reactive functionalized elastomer, and where from about 25 to 75 parts by weight silica is employed per 100 parts by weight elastomer;
cooling the initial composition;
further mixing the initial composition with additional ingredients including at least one of a silica coupling agent and a silica reactive dispersing agent to form an intermediate composition;
adding ingredients including a curative to the intermediate composition to form a vulcanizable mixture;
mixing the vulcanizable mixture;
forming the vulcanizable mixture into a tire component;
building a tire by including the tire component; and curing the tire;
where said method includes the step of adding from about 0.1 to about 6 parts by weight of titanium (IV) 2-ethyl-1,3-hexanediolate, per hundred parts by weight silica, where said of titanium (IV) 2-ethyl-1,3-hexanediolate is added prior to or during said step of further mixing.

6. A method for preparing a tire, the method comprising the steps of:
combining silica, elastomer, from about 0.1 to about 6 parts by weight of titanium (IV) 2-ethyl-1,3-hexanediolate, per hundred parts by weight silica, and optionally other ingredients to form a first mixture adding, where the elastomer is a homopolymer or copolymer of conjugated dienes or vinyl aromatic monomers, and where from about 5 to about 100% of the elastomer is functionalized with a silica-reactive functional group, where from about 25 to about 75 parts by weight silica is employed per 100 parts by weight elastomer;
cooling the first mixture;
further mixing the first mixture with a silica coupling agent and, optionally with additional ingredients including a silica reactive dispersing agent to form an intermediate mixture;
adding ingredients including a curative to the intermediate mixture to form a vulcanizable mixture;
mixing the vulcanizable mixture;
forming the vulcanizable mixture into a tire component;
building a tire by including the tire component; and
curing the tire.

7. The method of claim 6, where the elastomer comprises trialkoxysilyl-funtionalized poly(styrene-co-butadiene).

8. The method of claim 1, where said first mixture further comprises carbon black.

* * * * *